US010028202B2

(12) United States Patent
Deng et al.

(10) Patent No.: US 10,028,202 B2
(45) Date of Patent: Jul. 17, 2018

(54) METHODS FOR TRANSMITTING AND RECEIVING INFORMATION AND ASSOCIATED IOT APPARATUS

(71) Applicant: MediaTek Singapore Pte. Ltd., Singapore (SG)

(72) Inventors: Dong-Bo Deng, Chengdou (CN); Jian-Zhong He, Chengdou (CN); Ko-Ming Chan, Taichung (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 716 days.

(21) Appl. No.: 14/571,294

(22) Filed: Dec. 16, 2014

(65) Prior Publication Data
US 2015/0181505 A1 Jun. 25, 2015

(30) Foreign Application Priority Data

Dec. 20, 2013 (CN) .......................... 2013 1 0714256
Jul. 28, 2014 (CN) .......................... 2014 1 0363751

(51) Int. Cl.
H04W 48/10 (2009.01)
H04W 12/04 (2009.01)
H04W 72/00 (2009.01)
H04W 84/12 (2009.01)
H04L 29/06 (2006.01)
H04W 12/02 (2009.01)
H04W 4/70 (2018.01)

(52) U.S. Cl.
CPC ........... *H04W 48/10* (2013.01); *H04W 12/04* (2013.01); *H04W 72/005* (2013.01); *H04L 63/0428* (2013.01); *H04W 4/70* (2018.02); *H04W 12/02* (2013.01); *H04W 84/12* (2013.01)

(58) Field of Classification Search
CPC ... H04W 48/10; H04W 72/005; H04W 84/12; H04W 12/02; H04W 4/005; H04W 12/04; H04L 63/0428; H94W 12/04
See application file for complete search history.

(56) References Cited

U.S. PATENT DOCUMENTS 9,338,130 B2 * 5/2016 Von Huben ............. H04L 61/35
2008/0117847 A1 5/2008 Hamada
2008/0285495 A1 * 11/2008 Wentink ................ H04W 12/02
370/311

(Continued)

FOREIGN PATENT DOCUMENTS

JP 2006524464 A 10/2006
WO 03045012 A1 5/2003

OTHER PUBLICATIONS

"Guidelines for Enterprise IP multicast Address Allocation", pp. 1-57, Cisco Systems White Paper, 2004.*

(Continued)

*Primary Examiner* — Catherine Thiaw
*Assistant Examiner* — Thomas Ho
(74) *Attorney, Agent, or Firm* — Winston Hsu

(57) ABSTRACT

A method for transmitting information is disclosed, including: writing at least a portion of the information to at least one multicast Internet Protocol (IP) address field; and transmitting at least a packet according to the at least one multicast IP address field. Even when the wireless network environment is encrypted, information can be transmitted to desired devices in the sniffer mode.

7 Claims, 11 Drawing Sheets

(56) References Cited

U.S. PATENT DOCUMENTS

| | | | |
|---|---|---|---|
| 2009/0279701 A1* | 11/2009 | Moisand | H04L 12/185 380/270 |
| 2011/0032914 A1 | 2/2011 | Venkateswaran | |
| 2014/0226817 A1* | 8/2014 | Von Huben | H04L 61/35 380/270 |

OTHER PUBLICATIONS

"The TCP/IP Guide", IP Multicast Addressing, 2005, http://www.tcpipguide.com/free/t_IPMulticastAddressing.htm.*
Microsoft Docs, "How IPv4 Multicasting Works", Oct. 8, 2009,I https://docs.microsoft.com/en-us/previous-versions/windows/it-pro/windows-server-2003/cc759719(v=ws.10), pp. 1-50.*
Juan-Mariano de Goyeneche, "Multicast Explained", Mar. 20, 1998, https://www.tldp.org/HOWTO/Multicast-HOWTO.html#toc2.*
Park et al. RFC 4489: "A Method for Generating Link-Scoped IPv6 Multicast Addresses", Apr. 2006. Internet Engineering Task Force.*
Juniper Networks, "Multicast Overview", https://www.juniper.net/documentation/en_US/junos/topics/concept/multicast-ip-overview.html, Aug. 31, 2017.*
Sungmin Hong et al., Snail: An IP-Based Wireless Sensor Network Approach to the Internet of Things, The Internet of Things, Dec. 2010, pp. 34-42, IEEE Wireless Communications, XP011340671, IEEE.
Charles M. Kozierok, The TCP/IP Guide, A Comprehensive, Illustrated Internet Protocols Reference, Sep. 20, 2005, cover page, chapters 6, 12-14, 25, and 30, Covers IPv4 and IPv6, XP055187626.

* cited by examiner

| | 4 bits | 5 bits | 23 bits |
|---|---|---|---|
| IPv4 address | 0xe | | Multicast ID |
| MAC address | 00000001 00000000 01011110 0 | | Multicast ID |
| | 25 bits | | 23 Bits |

| | 8 bits | 4 bits | 4 bits | 80 bits | | 32 bits |
|---|---|---|---|---|---|---|
| IPv6 address | 11111111 | Flag | Region | 0(Reserved) | | Multicast ID |
| MAC address | | | | | 0x3333 | Multicast ID |
| | | | | | 16 bits | 32 bits |

FIG. 1

METHODS FOR TRANSMITTING AND RECEIVING INFORMATION AND ASSOCIATED IOT APPARATUS

BACKGROUND

The disclosed embodiments of the present invention relate to wireless communications, and more particularly, to Internet of Things (IoT) communications.

With the development of information technology, IoT is more and more popular. As the name suggests, IoT is a network consisting of many interconnected devices. IoT possesses intelligent perception, identification, and interconnection functions, and is part of the third wave of the information industry, coming after computers and the Internet.

It is desirable for many IoT devices, such as monitors and smart refrigerators, to connect to the Internet through Wireless Fidelity (WiFi), enabling them to be controlled by a user via the Internet. IoT devices may not have input functions such as a keypad or touchpad, however. How to control those IoT devices to connect to a designated Access Point (AP) therefore becomes an issue.

SUMMARY

One of the objectives of the present invention is to provide methods for transmitting and receiving information, and an associated IOT apparatus, to solve the above mentioned issues.

According to a first aspect of the present invention, a method for transmitting information is disclosed. The method comprises: writing at least a portion of the information to at least one multicast Internet Protocol (IP) address field; and transmitting at least a packet according to the at least one multicast IP address field. In one embodiment, the method further comprises performing a predetermined process upon original information to generate the information, such as inserting identifier information into the original information.

According to a second aspect of the present invention, a method for receiving information is disclosed. The method comprises: receiving at least one packet; and reading a multicast Media Access Control (MAC) address field of each packet to obtain at least a portion of the information.

According to a third aspect of the present invention, an Internet of Things (IoT) apparatus for receiving information is disclosed. The IoT apparatus comprises a receiving module and a reading module. The receiving module is arranged to receive at least one packet. The reading module is arranged to read a multicast Media Access Control (MAC) address field of each packet to obtain at least a portion of the information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram illustrating the mapping relationship between multicast IP addresses and multicast MAC addresses.

DETAILED DESCRIPTION

Figure 2A:
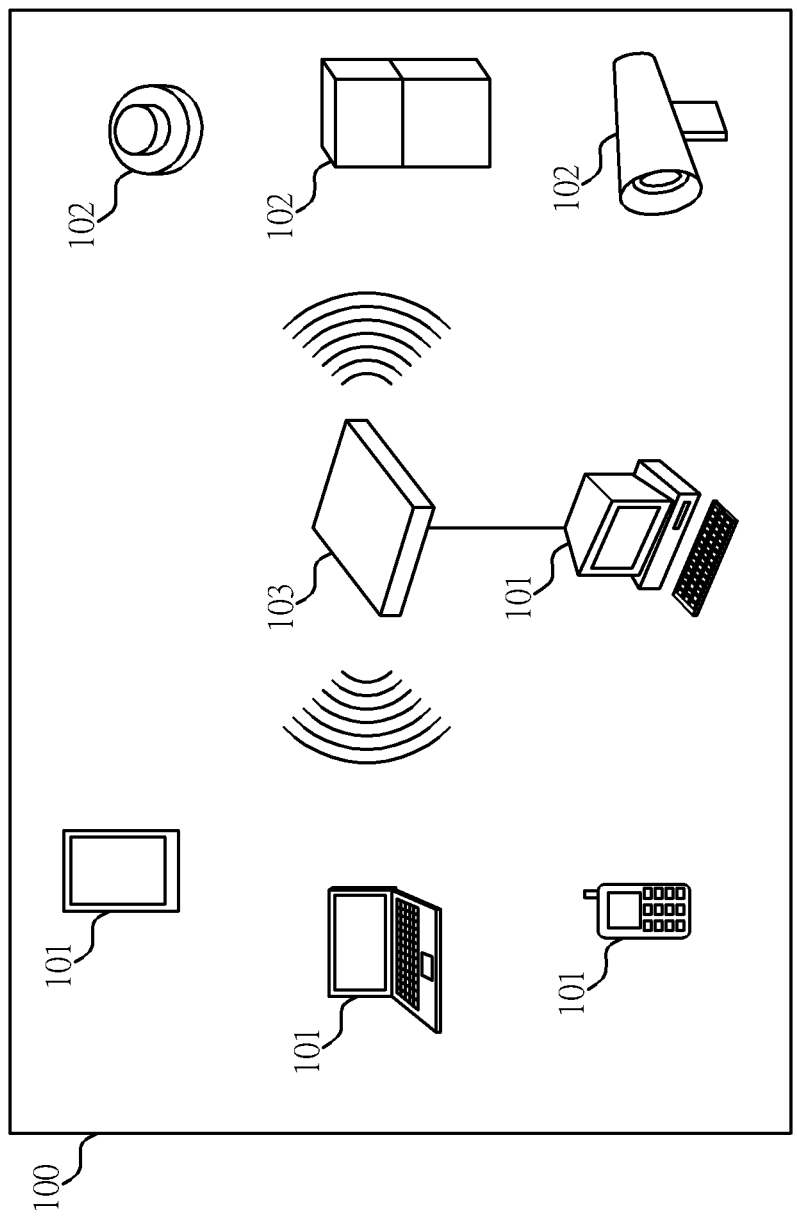
FIG. 2A is a diagram illustrating a wireless communication network according to an embodiment of the present invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

There are several methods for controlling an IoT device to connect to a designated AP (e.g. a wireless router). The first method may use a communication device (e.g. a smart phone or a notebook) to connect to the IoT device via Peer-to-Peer (P2P) technology. The communication device may then be operable to transmit AP configuration information, such as a Service Set Identifier (SSID) and/or password, to the IoT device. The IoT device may subsequently connect to the designated AP according to the received AP configuration information. With regard to the second method, the IoT device may be initialized to the AP mode in the first step. A communication device may then be connected to the IoT device for transmitting AP configuration information, such as an SSID/or and password, to the IoT device. After receiving the AP configuration information, the IoT device may switch to the station mode, and then connect to the designated AP according to the AP configuration information. With regard to the third method, the IoT device may try to connect to a default AP in the first step. After the connection is built up, the IoT device may receive AP configuration information, such as an SSID and/or password, from the communication device through TCP/IP protocol. The IoT device then subsequently connects to the designated AP in accordance with the AP configuration information. With regard to the fourth method, the IoT device may be initialized to a sniffer mode, then fetches AP configuration information, such as an SSID and/or password, from packets transmitted from the communication device by sniffing the packets. In this way, the IoT device can connect to the designated AP.

The invention is mainly directed to the fourth method; exemplary embodiments are disclosed hereinafter. In the sniffer mode, the IoT device may receives any packet in the wireless network to which the IoT device belongs, by using a receiving module (e.g. a WiFi chip). For an unencrypted environment, the IoT device may reads all the clear data in the packets. Information required to be read by the IoT may be put into the data field of a packet, which is then sent to the network. The IoT device can receive and utilize the data directly. For an encrypted environment, however, the IoT device cannot decrypt the packets, read and utilize the data directly.

According to the 802.11 specification, only the data field is encrypted for encrypted packets, while the header is left unencrypted. Therefore, if the desired data is put into the header, the IoT devices can derive the data from the header in the sniffer mode. Most relevant applications cannot modify the 802.11 header directly, however, and thus the driver has to be rewritten. The methods to insert information into the 802.11 header are described in the following.

Many modern mainstream operating systems support multicast function. As known in the art, a mapping relationship exists between the multicast Internet Protocol (IP) address and the multicast Media Access Control (MAC) address. FIG. 1 is a diagram illustrating the mapping relationship therein. As shown in FIG. 1, for the Internet Protocol version 4 (IPv4), the lower 23 bits of the IP address field are mapped to the lower 23 bits of the MAC address field; for the Internet Protocol version 6 (IPv4), the lower 32 bits of the IP address field are mapped to the lower 32 bits of the MAC address field. According to the 802.11 protocol, the MAC address may be employed, wherein the MAC address will be put in the header. By using this characteristic, it is possible to modify the 802.11 header, by inserting the data to be sent to the IoT device into the 802.11 header.

FIG. 2A is a diagram illustrating a wireless communication network according to an embodiment of the present invention. As shown in FIG. 2, the wireless communication network 100 includes a communication device 101, an IoT device 102 and an AP 103. There may be more than one communication device 101, and the communication device 101 may be a notebook, a mobile phone, a Personal Digital Assistant (PDA), or a tablet, which supports IP multicast. The IoT device 102 may be a refrigerator, a camera, an air conditioner, or a heater equipped with a receiving module (e.g. a WiFi chip) and supports sniffer mode. An IoT device equipped with a WiFi chip may have the WiFi chip embedded in the IoT device or the IoT device coupled to the WiFi chip.

Figure 2B:
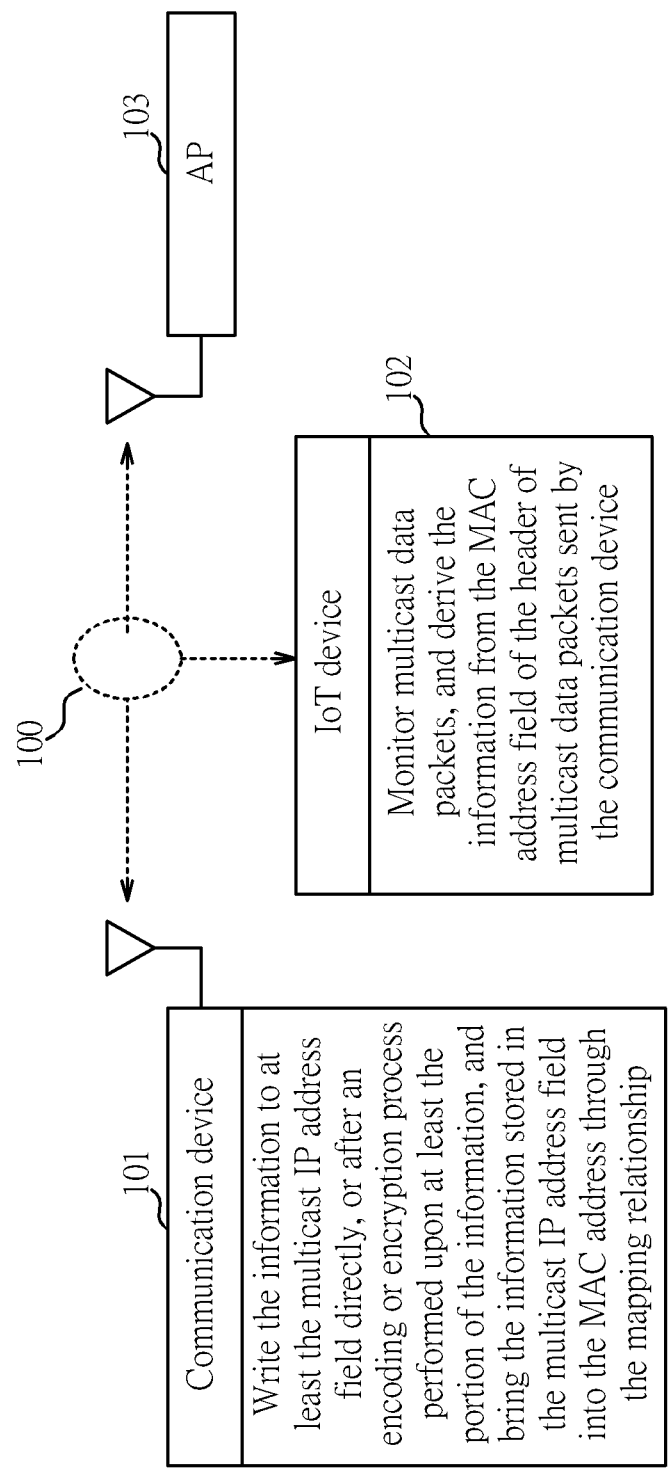
FIG. 2B is a diagram illustrating utilizing the multicast MAC address to transmit information in the wireless communication network shown in FIG. 2A.

FIG. 2B is a diagram illustrating utilizing a multicast MAC address to transmit information in the wireless communication network 100 according to an embodiment of the present invention. As shown in FIG. 2B, the communication device 101 is controlled to connect to the AP 103 in the first step. Information is written to the multicast IP address field directly, or after an encoding and/or encryption process is performed upon the information. Through the mapping relationship, the information stored in the multicast IP address field is brought into the MAC address. In this way, the information is put into the header of the multicast data packet to be transmitted by the communication device 101.

In the end, the communication device 101 transmits any data to the multicast IP address. The IoT device 102 may be initialized to the sniffer mode, wherein the IoT device 102 monitors multicast data packets in the wireless communication network 100, and derives the information from the MAC address field of the header of multicast data packets. The IoT device 102 thus can perform corresponding operations based on a predefined agreement. For example, according to the predefined agreement, the communication device 101 may sends the SSID and the password to the IoT device 102, and the IoT device 102 can connect to the AP 103 after receiving the SSID and the password.

Figure 3:
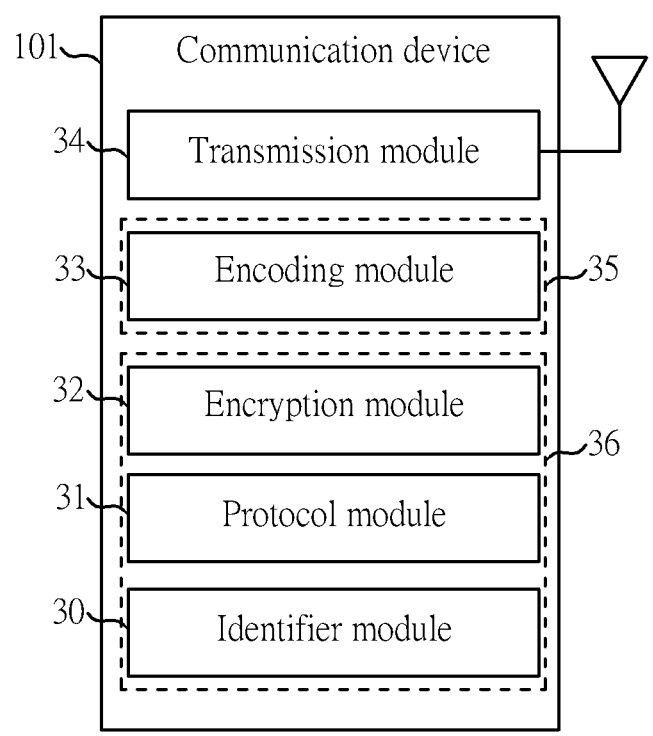
FIG. 3 is a simplified block diagram illustrating a communication device according to an embodiment of the present invention.

FIG. 3 is a simplified block diagram illustrating the communication device 101 according to an embodiment of the present invention. For brevity, only modules pertinent to the invention are shown in FIG. 3. The communication device 101 may include a transmission module 34, a writing module 35 and a processing module 36. The writing module 35 includes an encoding module 33, and the processing module 36 includes an identifier module 30, a protocol module 31 and an encryption module 32. The processing module 36 is used to perform a predetermined process upon original information to produce information, wherein the original information may be the SSID and/or the password of the AP 103. The writing module 35 is used to write at least a portion of the information to at least one multicast IP address field.

Specifically, the identifier module 30 may be used to identify which IoT device(s) is the target device that the information should be sent to, especially when there are several IoT devices in the network. By way of example, but not limitation, the WiFi MAC address of the IoT device may be used for identifier information. The protocol module 31 may generate data according to the predefined agreement, so that the IoT device 102 may follow the agreement to parse the data and perform corresponding operations. For instance, the IoT device 102 receives the SSID and the password, and then connects to the AP 103. The encryption module 32 may be used to encrypt the information to ensure security and prevent information leakage. The encoding module 33 may include the following functions. The first is slicing the data to be sent. Since there are, at most, 23 and 32 bits that may be mapped to the MAC address for the IPv4 and IPv6, respectively, data which is more than 23 bits (IPv4) or 32 bits (IPv6) needs to be sliced. Each sliced data should not be more than 23 bits (IPv4) or 32 bits (IPv6). The encoding module 33 can generate sliced data according to the Internet protocol.

The second function of the encoding module 33 is to employ a synchronous field. The IoT device 102 cannot distinguish which packet(s) are transmitted by the communication device 101 in the sniffer mode as the IoT device 102 would receive all the packets in the wireless communication network 100. The synchronous field can help the IoT device 102 to identify whether the received multicast data is from the communication device 101. In one example, specific data may be put into the lower 23 bits for synchronization, e.g. 0x12:0x12:0x12. The specific data may be repeated several times, so that the IoT device 102 can ensure the information according to the source MAC address after receiving the specific data several times. The source MAC address mentioned above is the Source Address (SA) in the 802.11 header. If the source address of the received multicast data does not match the MAC address of the communication device 101, the IoT device 102 may abandon the data.

The third function of the encoding module 33 is to employ a serial number. Since multicast data transmission under the User Datagram Protocol (UDP) is not reliable, the communication device 101 may attach the serial number to each packet data, so as to avoid the data loss. In the IPv4 case, the bits [16-22] may be used to carry the serial number, and the bits [0-15] may be used to carry the sliced data. In this way, the IoT device 102 can correctly assemble (combine) the received sliced data according to the serial number.

The fourth function of the encoding module 33 is to write the processed data to a portion (e.g. 16 bits) of the lower 23 bits of the IPv4 address or a portion (e.g. 24 bits) of the lower 32 bits of the IPv6 address directly, or after an encoding and/or encryption process is performed upon at least the portion of the processed data. As mentioned above, the lower 23 bits of the IPv4 address or the lower 32 bits of the IPv6 address are mapped to the multicast MAC address. Note that the second and the third functions are optional, and may be modified, i.e., the invention is not limited to the second and the third functions.

The transmission module 34 may arbitrarily send out multicast data based on the IP address generated by the encoding module 33, i.e. the data field of the UDP data packet may be filled by arbitrary content. The transmission module 34 may transmit one packet more than once to the same IP address in case of UDP packet loss. In the above modules, the identifier module 30, the protocol module 31 and the encryption module 32 are optional. Those skilled in the art may include these modules based on practical requirements. In addition, the modules may be implemented based on existing modules.

Figure 4:
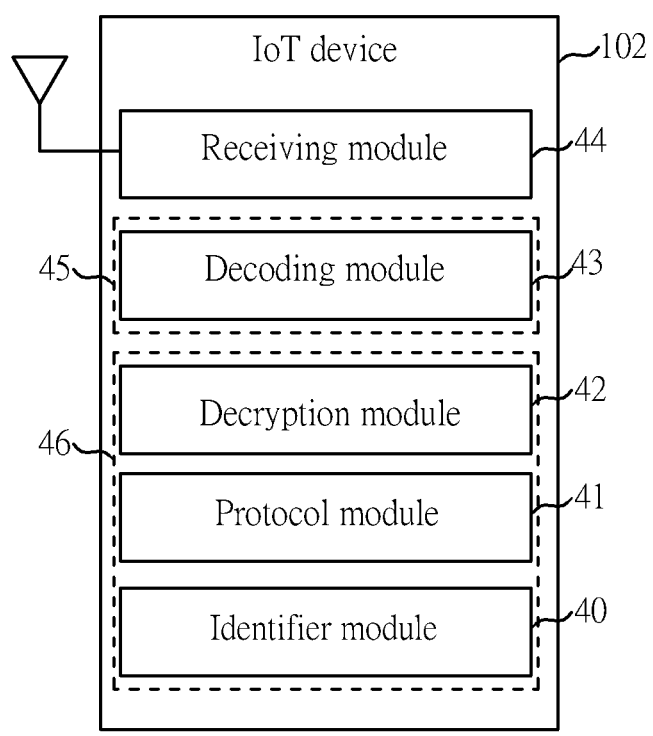
FIG. 4 is a simplified block diagram illustrating an IoT device according to an embodiment of the present invention.

FIG. 4 is a simplified block diagram illustrating the IoT device 102 according to an embodiment of the present invention. For brevity, only modules pertinent to the invention are shown in FIG. 4. The communication device 102 may include a receiving module 44, a reading module 45 and a processing module 46. The reading module 45 may include a decoding module 43. The processing module 46 may include an identifier module 40, a protocol module 41 and a decryption module 42. The receiving module 44 may monitor (sniffer) and receive multicast packets in the wireless communication network 100, and fetch a portion of or all lower 23 bits of the Destination Address (DA) field (for the IPv4), or a portion of or all lower 32 bits of the DA field (for the IPv6), where the DA filed is the DA field of the header of the 802.11 MAC address. The reading module 45 is used to read the multicast MAC address field of the packet received by the receiving module 44, so as to obtain required information, such as the SSID and/or the password of the AP 103. The processing module 46 is used to perform a predetermined process upon the contents read from the multicast MAC address field.

The identifier module 40 is used by the IoT device 102 to determine whether the data received by the receiving module 44 is desired. In one example, the IoT device 102 may compare its MAC address with the MAC address of the received data. If the MAC address of the IoT device 102 matches the MAC address of the received data, it can be ensured that the data is designated to the IoT device 102. The protocol module 41 may be used to parse the received data in accordance with the predefined agreement, i.e. performing a corresponding operation upon the data. For instance, the protocol module 41 may control the IoT device 102 to connect to the AP 103 by using the parsed SSID and password. The predefined agreement may be configured to both the transmitter and receiver in advance. The decryption module 42 may be operable to decrypt the received multicast packet, wherein the encryption and decryption algorithms may also be predetermined by the communication device 101 and the IoT device 102 in advance.

The decoding module 43 may include the following functions. The decoding module 43 may determine the SA (i.e. the MAC address of the communication device 101) according to the synchronous field of the received packets. The decoding module 43 may be operable to decode data in accordance with the encoding process of the encoding module 33 of the communication device 101. For instance, the decoding module 43 may be operable to extract the bits [16-23] of the MAC address, and use the 8 bits for the serial number. Further, the bits [0-15] may be used for data. The third function of the decoding module 43 is to assemble the received data. Since the received data is a result of a slicing operation performed by the encoding module, the decoding module 43 has to constitute the original data by using the sliced data. For the above function, the identifier module 40, the protocol module 41 and the decoding module 42 are optional and may be modified.

Figure 5:
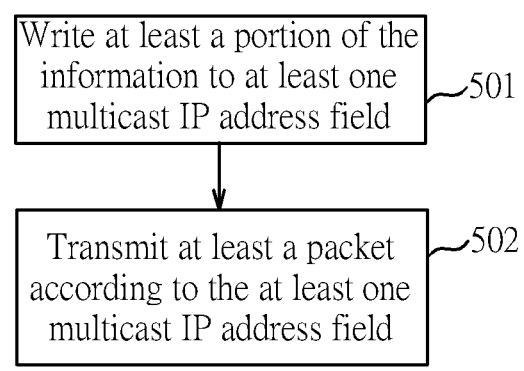
FIG. 5 is a flowchart illustrating a method for transmitting information by multicast MAC address according to an embodiment of the present invention.

FIG. 5 is a flowchart illustrating a method for transmitting information by multicast MAC address according to an embodiment of the present invention. In step 501, the communication device 101 may be operable to write at least a portion of the information to at least one multicast Internet Protocol (IP) address field. In step 502, the communication device 101 may be operable to transmit at least a packet by using the transmission module 34 according to the at least one multicast IP address field. Note that writing at least a portion of the information to at least one multicast IP address field means writing at least the portion of the information to at least the multicast IP address field directly, or after an encoding and/or encryption process is performed upon at least the portion of the information.

Figure 6:
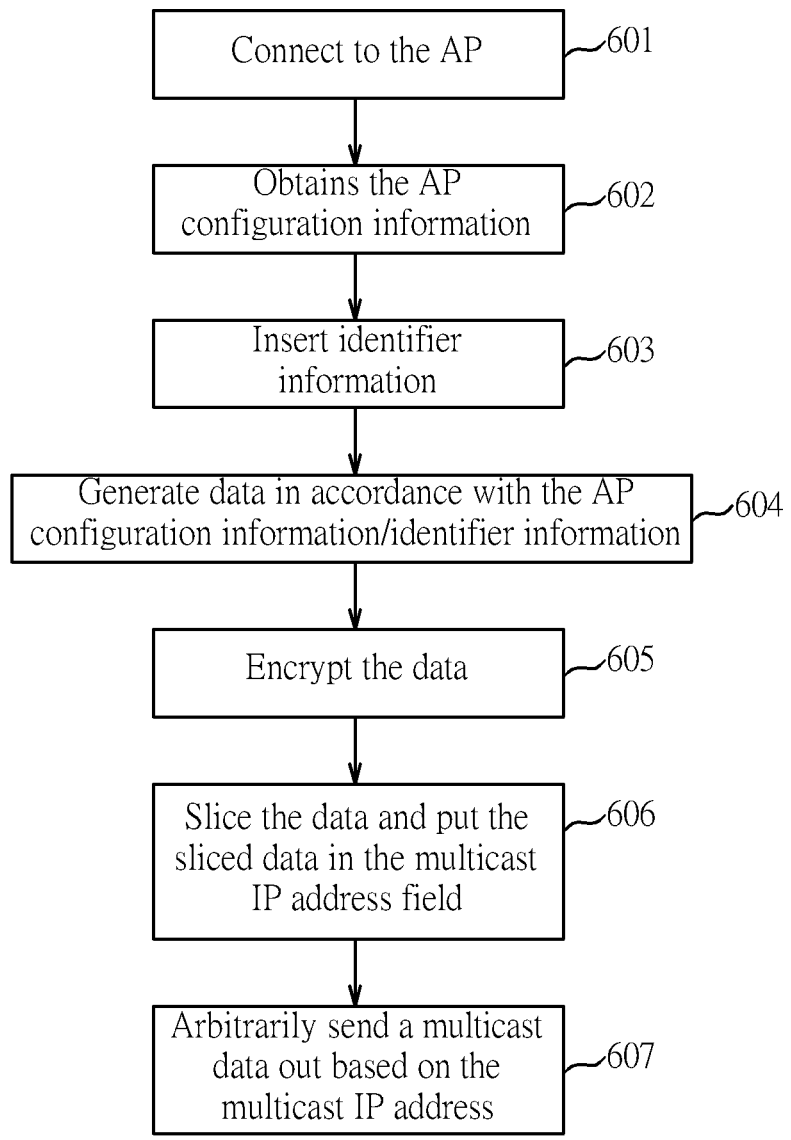
FIG. 6 is a flowchart illustrating a method for transmitting information by utilizing multicast MAC address according to another embodiment of the present invention.

FIG. 6 is a flowchart illustrating a method for transmitting information by utilizing multicast MAC address according to another embodiment of the present invention. The communication device 101 may designates the IoT device 102 to connect to the AP 103 by sending information to the IoT device 102 through the multicast MAC address. In step 601, the communication device 101 may be controlled to connect to the AP 103. In step 602, the communication device 101 obtains the AP configuration information of the AP 103, wherein the configuration information may include a username, a Service Set Identifier (SSID), and/or a password. In step 603, the identifier module 30 of the communication device 101 may be operable to insert identifier information into the obtained AP configuration information, so that the IoT device 102 may determine the desired information and can parse data correctly. In step 604, the protocol module 31 of the communication device 101 may be operable to generate data in accordance with the AP configuration information/identifier information derived from steps 602-603. In step 605, the encryption module 32 of the communication device 101 may be operable to encrypt the data. In step 606, the encoding module 33 of the communication device 101 may be operable to slice the data and put the sliced data in the multicast IP address field. For the IPv4 protocol, the communication device 101 may put the data at the lower 23 bits of the multicast IP address; for the IPv6 protocol, the communication device 101 may put the data at the lower 32 bits of the multicast IP address. Thus, a plurality of multicast IP addresses is produced. In addition, a serial number may be attached to each sliced data. In step 607, the transmission module 34 of the communication device 101 may arbitrarily send out multicast data based on the multicast IP address generated in step 606 (i.e. the data field of the packet may be filled by arbitrary content and the IP address is the destination address). Steps 603-606 are optional, and the invention may be applicable to transmit any desired information instead of being limited to the AP configuration information.

Figure 7:
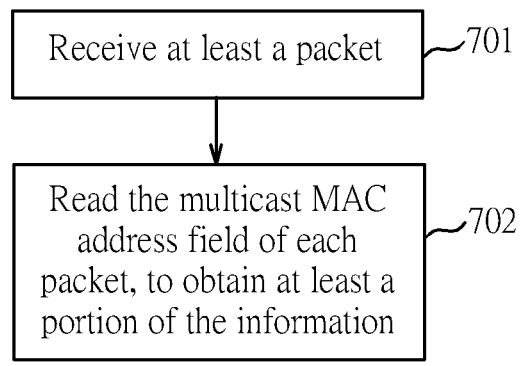
FIG. 7 is a flowchart illustrating a method for receiving information by utilizing multicast MAC address according to an embodiment of the present invention.

FIG. 7 is a flowchart illustrating a method for receiving information by utilizing multicast MAC address according to an embodiment of the present invention. The IoT device 102 may be operable to receive at least a packet through the receiving module 44. In step 702, the IoT device 102 reads the multicast MAC address field of each packet to obtain at least a portion of the information.

Figure 8:
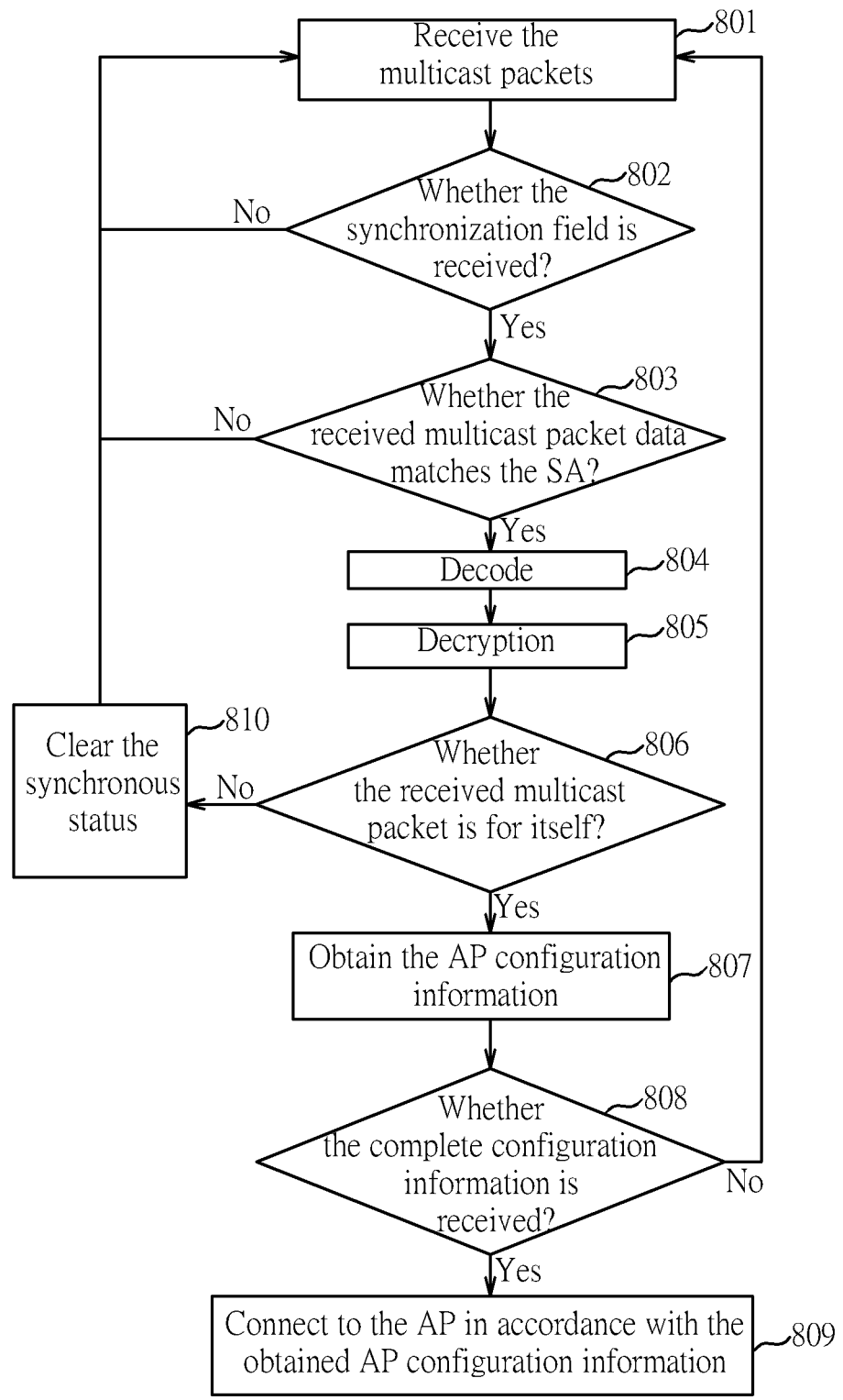
FIG. 8 is a flowchart illustrating a method for receiving information by utilizing multicast MAC address according to another embodiment of the present invention.

FIG. 8 is a flowchart illustrating a method for receiving information by utilizing multicast MAC address according to another embodiment of the present invention. The IoT device 102 may be operable to receive information by utilizing the multicast MAC address, and can thereby be controlled to connect to the AP 103 designated by the communication device 101. In step 801, the receiving module 44 of the IoT device 102 receives the multicast packets. In step 802, the IoT device 102 may determine the synchronization field of the received multicast packet, and can then parse out the SA of the communication device 101 from the synchronization field. The IoT device 102 may determines whether the synchronization field is completely received. If not, the flow will return to step 801 for receiving the remaining multicast packets; if the synchronization field is completely received, the flow will go to step 803. In step 803, the IoT device 102 may be operable to determine whether the received multicast packet data matches the SA (i.e. whether the received multicast packet data is the same as the SA). If not, the data will be abandoned and the flow will return to step 801 for receiving the remaining multicast packets; if the received multicast packet data matches the SA, the flow will go to step 804. In step 804, the decoding module 43 of the IoT device 102 may be operable to perform the decoding process. In one example, the decoding module 43 of the IoT device 102 may decode the received data by using a decoding mechanism corresponding to the encoding mechanism of the communication device 101. In step 805, the decryption module 42 of the IoT device 102 may be operable to decrypt the received data, wherein the decryption mechanism may be predefined in advance according to the encryption mechanism of the communication device 101. In step 806, the IoT device 102 may be operable to determine whether the received multicast packet is for the IoT device 102 (i.e. whether the identity matches that of the IoT device 102). In an exemplary embodiment, the identity check may be performed by the identifier module 40 by referring to the identifier information, wherein the MAC address of the IoT device 102 may be used as the identifier information. The identifier module 40 may determine whether the received multicast packet is for the IoT device 102 by checking whether the received MAC address is the same as its own MAC address. If the identity of the multicast packet is not confirmed, the flow will go to step 810; otherwise the flow will go to step 807.

In step 810, the IoT device 102 may be operable to clear the synchronous status. In step 807, the IoT device 102 may be operable to obtain the AP configuration information of the AP 103, such as the SSID and the password. In step 808, the IoT device 102 may be operable to confirm whether the complete configuration information is received (such as the SSID and the password). In one exemplary embodiment, the length of the SSID and the password may be utilized to determine whether the complete configuration information is received. In step 809, the IoT device 102 may be operable to connect to the AP 103 in accordance with the obtained AP configuration information. The steps 802-806 are optional, and the invention is not limited to transmitting the AP configuration information, and may be applicable to any other information for transmission. For the IoT device 102, the technical feature is to receive and identify the multicast packets when in sniffer mode, and to derive information from the lower 23 bits (lower 32 bits for the IPv6) in the multicast MAC address field. By using this method, even in an encrypted wireless network, it is also feasible to control an IoT device in the sniffer mode to connect to a designated AP.

Figure 9:
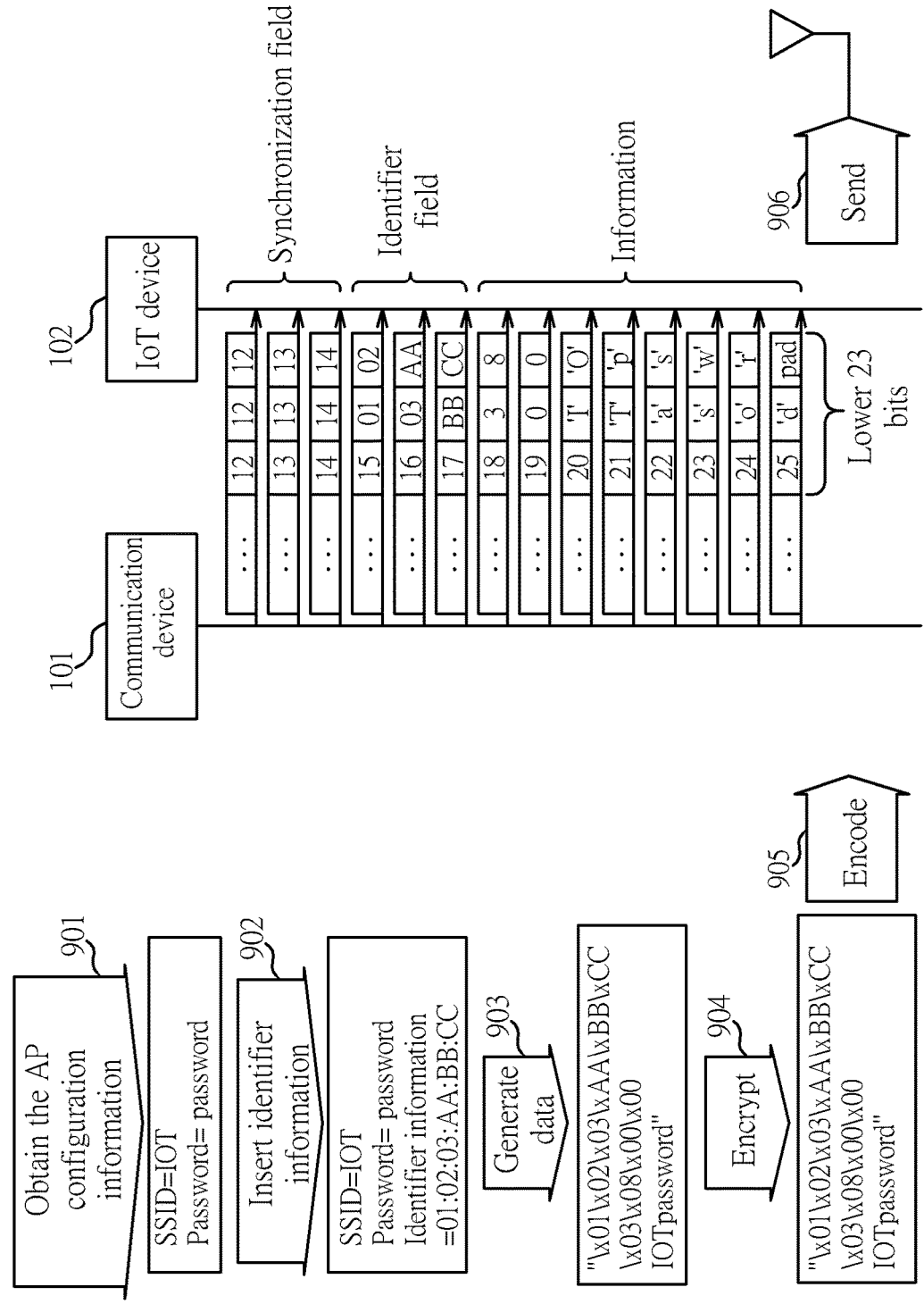
FIG. 9 is a diagram illustrating packet generation, encryption, encoding and transmission process of a communication device according to an embodiment of the present invention.

FIG. 9 is a diagram illustrating packet generation, encryption, encoding and transmission process of a communication device 101 according to an embodiment of the present invention. In step 901, the communication device 101 may be operable to obtain the AP configuration information (such as the SSID and the password) of the AP 103. In this embodiment, the SSID is set to be "IOT", and the password is set to be "password". In step 902, the communication device 101 may be operable to insert the identifier information in the data. In one example, the MAC address (01:02:03:AA:BB:CC) of the IoT device 102 may be employed to be the identifier information. The IoT device 102 may be operable to compare the MAC address of the received data with its own MAC address, so as to make sure the data is for the IoT device 102. Note that the invention is not limited to one IoT device. In one example, the identifier information may be set to be the broadcast address (FF:FF:FF:FF:FF:FF). In step 903, the protocol module 31 of the communication device 101 may be operable to generate data according to the predefined agreement. In an exemplary embodiment, the length of the SSID (SL), the length of the password (PL), the length of the username (UL) and a reserved byte (R) may be attached to the identifier field. In one embodiment, SL=3, PL=8, UL=0. In step 904, the encryption module 32 of the communication device 101 may be operable to encrypt the generated data. Note that, in the invention, the encryption mechanism is not limited. In one example, the encryption may be omitted. In step 905, the encoding module 33 of the communication device 101 may be operable to slice the generated data. In one example, the length of each sliced data may be two bytes, and the sliced data may be put in the lower 16 bits of the address field. The encoding module 33 of the communication device 101 may insert a serial number for each sliced data, such that the IoT device may correctly assemble the sliced data. The encoding module 33 of the communication device 101 may also insert a synchronization field. In this way, the IoT device may be determine the SA of the data and the data may be received accurately. In step 906, the transmission module 34 may be operable to arbitrarily send out multicast data packet(s) based on the multicast IP address generated by the encoding module 33.

The invention utilizes the mapping relationship between the multicast IP address and the MAC address to put the AP configuration information in the header complying with the 802.11 protocol. The AP configuration information may be exposed in the whole wireless network range, however. In other words, any device in the same wireless network can easily obtain the AP configuration information. The Advanced Encryption Standard (AES) standard may be employed to improve the security. Note that the invention is not limited to the AES mechanism.

Figure 10:
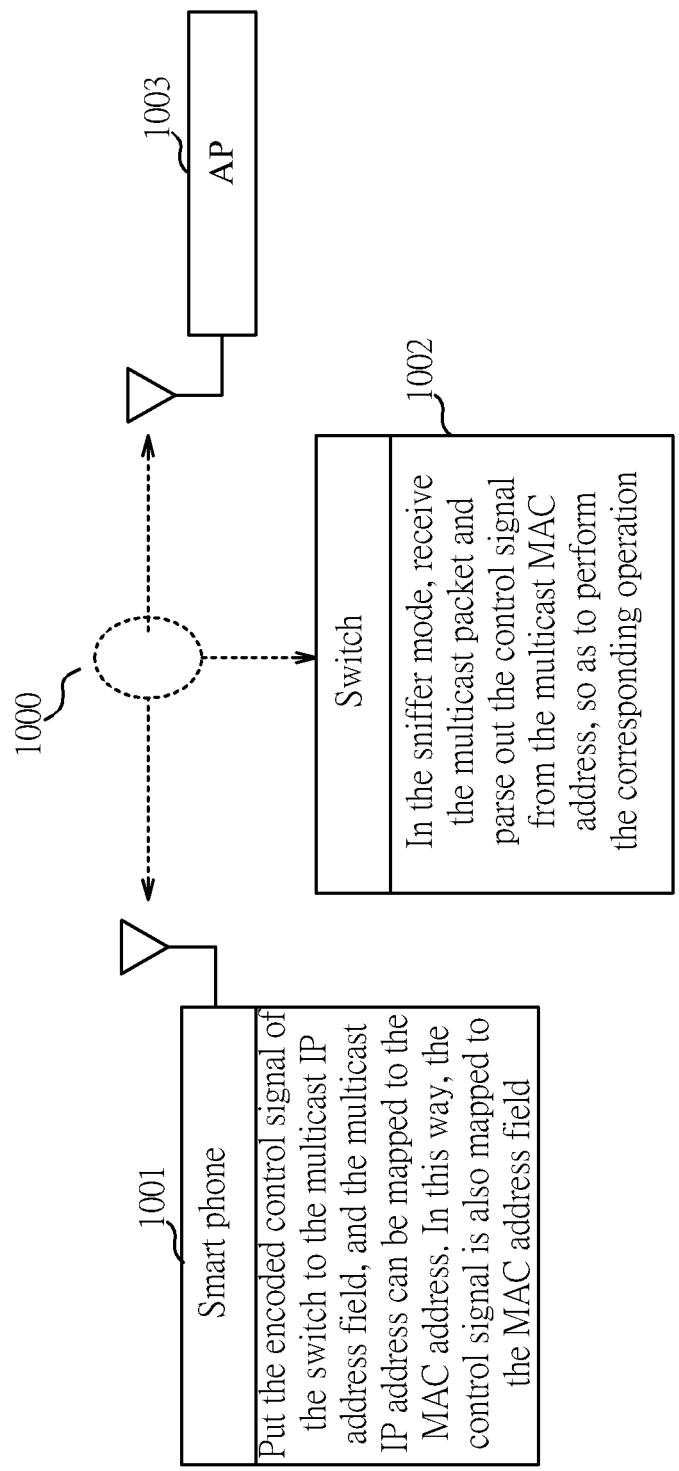
FIG. 10 is a diagram illustrating transmitting/receiving information by utilizing the multicast MAC address according to an embodiment of the present invention.

FIG. 10 is a diagram illustrating transmission/receiving information by utilizing the multicast MAC address according to an embodiment of the present invention. In the embodiment, a smart phone may act as the communication device 1001, and a switch may act as the IoT device 1002. The smart phone may be operable to put the encoded control signal (e.g. turn on turn off) to the multicast IP address field, and the multicast IP address can be mapped to the MAC address. In this way, the control signal is also mapped to the MAC address field and transmitted to the wireless internet. The switch in the sniffer mode thus can receive the multicast packet and parse out the control signal from the multicast MAC address, in order to perform the corresponding operation (e.g. turn on or turn off).

The invention is not limited to transmit AP configuration information or switch control information through the multicast MAC address. Control signals may also be sent to the designated air conditioner, television, or refrigerator. By using the method of the invention, it is also feasible to control devices in the sniffer mode even in an encrypted wireless network.

In particular, it is envisaged that the aforementioned inventive concept can be applied by a semiconductor manufacturer to any integrated circuit comprising a radio frequency and/or synchronous clock application. It is further envisaged that a semiconductor manufacturer may employ the inventive concept in the design of a stand-alone device, application-specific integrated circuit (ASIC) and/or any other sub-system element.

Aspects of the invention may be implemented in any suitable form including hardware, software, firmware or any combination thereof. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. The functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor or controller. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

An improved communication unit and sliced radio frequency module have been described, wherein the aforementioned disadvantages of prior art arrangements have been substantially alleviated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transmitting information, comprising:
   slicing the information into a plurality of sliced information depending on a bit length of multicast Internet Protocol (IP) address field;
   inserting a serial number to each of the plurality of sliced information;
   writing each of the plurality of sliced information to a multicast IP address field to generate a plurality of multicast IP addresses; and
   transmitting multicast data packets according to the generated multicast IP addresses.

2. The method of claim 1, further comprising:
   performing a predetermined process upon original information to generate the information.

3. The method of claim 2, wherein the step of performing the predetermined process upon the original information to generate the information comprises:
   inserting identifier information into the original information; and
   utilizing the original information and the identifier information to generate the information.

4. The method of claim 2, wherein the step of performing the predetermined process upon the original information to generate the information comprises:
   encrypting the original information to generate encrypted information; and
   utilizing the encrypted information to generate the information.

5. The method of claim 1, wherein the step of writing each of the plurality of sliced information to a multicast IP address field to generate a plurality of multicast IP addresses comprises:
   writing each of the plurality of sliced information to at least the multicast IP address field directly, or after an encoding or encryption process is performed.

6. The information transmission method of claim 1, further comprises:
   inserting synchronization information to the plurality of sliced information.

7. The information transmission method of claim 1, wherein the information comprises configuration information of access points, and the configuration information comprises a Service Set Identifier (SSID) and a password.

* * * * *